United States Patent
Kapoor

(10) Patent No.: US 10,528,476 B2
(45) Date of Patent: Jan. 7, 2020

(54) EMBEDDED PAGE SIZE HINT FOR PAGE FAULT RESOLUTION

(71) Applicant: International Business Machines Corporation, Armonk, NY (US)

(72) Inventor: Shakti Kapoor, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 480 days.

(21) Appl. No.: 15/163,372

(22) Filed: May 24, 2016

(65) Prior Publication Data

US 2017/0344489 A1   Nov. 30, 2017

(51) Int. Cl.

| G06F 12/1009 | (2016.01) |
|---|---|
| G06F 12/02 | (2006.01) |
| G06F 12/1027 | (2016.01) |
| G06F 12/128 | (2016.01) |
| G06F 12/08 | (2016.01) |

(52) U.S. Cl.
CPC ........ *G06F 12/1009* (2013.01); *G06F 12/023* (2013.01); *G06F 12/08* (2013.01); *G06F 12/1027* (2013.01); *G06F 12/128* (2013.01); *G06F 2212/1044* (2013.01); *G06F 2212/656* (2013.01); *G06F 2212/684* (2013.01)

(58) Field of Classification Search
CPC .......................... G06F 12/1009; G06F 12/1027
See application file for complete search history.

(56) References Cited

U.S. PATENT DOCUMENTS

| 6,549,997 | B2 * | 4/2003 | Kalyanasundharam ..................... G06F 12/1027 711/207 |
|---|---|---|---|
| 7,149,865 | B2 | 12/2006 | Chamberlain et al. |
| 8,930,596 | B2 | 1/2015 | Heidelberger et al. |
| 9,058,284 | B1 | 6/2015 | Ben-Meir et al. |
| 9,081,501 | B2 | 7/2015 | Assad et al. |
| 2004/0123017 | A1* | 6/2004 | Henry ................... G06F 3/0607 711/6 |
| 2005/0027962 | A1* | 2/2005 | Zhang ................. G06F 12/1036 711/207 |
| 2006/0036830 | A1 | 2/2006 | Dinechin et al. |
| 2011/0225389 | A1* | 9/2011 | Grisenthwaite ..... G06F 12/1009 711/206 |
| 2011/0283040 | A1* | 11/2011 | Chadha ............... G06F 12/1009 711/3 |

(Continued)

FOREIGN PATENT DOCUMENTS

JP       360118937 A       11/1983

OTHER PUBLICATIONS

Winwood, S., Yefim, Shuf, Y. & Franke, H.. "Multiple Page Size Support in the Linux Kernel." Proceedings of the Ottawa Linux Symposium. (pp. 573-593) 2002. Jan. 1, 2002.

*Primary Examiner* — Prasith Thammavong
*Assistant Examiner* — Edmund H Kwong
(74) *Attorney, Agent, or Firm* — Middleton Reutlinger

(57) ABSTRACT

A page size hint may be encoded into an unused and reserved field in an effective or virtual address for use by a software page fault handler when handling a page fault associated with the effective or virtual address to enable an application to communicate to an operating system or other software-based translation functionality page size preferences for the allocation of pages of memory and/or to accelerate the search for page table entries in a hardware page table.

19 Claims, 4 Drawing Sheets

(56) References Cited

U.S. PATENT DOCUMENTS

| | | |
|---|---|---|
| 2013/0141446 A1 | 6/2013 | Hartog et al. |
| 2013/0318307 A1* | 11/2013 | Rabinovitch ....... G06F 12/0862 |
| | | 711/137 |
| 2015/0127767 A1 | 5/2015 | Gheith et al. |
| 2015/0286564 A1 | 10/2015 | Lim et al. |
| 2015/0301949 A1 | 10/2015 | Koka et al. |

* cited by examiner

EMBEDDED PAGE SIZE HINT FOR PAGE FAULT RESOLUTION

BACKGROUND

The invention is generally related to computers and computer software, and in particular, to memory address translation.

Memory management, i.e., the operations that occur in managing the data stored in a computer, is often a key factor in overall system performance for a computer. Among other tasks, memory management oversees the retrieval and storage of data on a computer, as well as manages certain security tasks for a computer by imposing restrictions on what users and computer programs are permitted to access.

Modern computers typically rely on a memory management technique known as virtual memory management to increase performance and provide greater flexibility in computers and the underlying architectural designs upon which they are premised.

With a virtual memory system, the underlying hardware implementing the memory system of a computer is effectively hidden from the software of the computer. A relatively large virtual memory space, e.g., 64-bits or more in width, is defined for such a computer, with computer programs that execute on the computer accessing the memory system using virtual addresses pointing to locations in the virtual memory space. The physical memory devices in the computer, however, are accessed via "real" addresses that map directly into specific memory locations in the physical memory devices. Hardware and/or software in the computer are provided to perform "address translation" to map the real memory addresses of the physical memory to virtual addresses in the virtual memory space. As such, whenever a computer program on a computer attempts to access memory using a virtual address, the computer automatically translates the virtual address into a corresponding real address so that the access can be made to the appropriate location in the appropriate physical device mapped to the virtual address.

One feature of virtual addressing it that is not necessary for a computer to include storage for the entire virtual memory space in the physical memory devices in the computer's main memory. Instead, lower levels of storage, such as disk drives and other mass storage devices, may be used as supplemental storage, with memory addresses grouped into "pages" that are swapped between the main memory and supplemental storage as needed.

In addition, some computer designs also include the concept of segmentation, which partitions the virtual memory into different segments (each mapped to blocks of pages) in order to facilitate memory protection, simplify the handling of large and growing data structures, and otherwise provide greater flexibility for performing memory management when multiple processes are capable of being handled in a computer at any given time. When segmentation is used, an additional layer of indirection is used, requiring an additional translation to be performed. Typically, in systems incorporating segmentation and paging, computer programs access the memory system using "effective" addresses that map to virtual addresses, thus requiring a translation first from effective to virtual address, then from virtual to real address.

Due to the frequency of access requests in a computer, address translation can have a significant impact on overall system performance. As such, it is desirable to minimize the processing overhead associated with the critical timing path within which address translation is performed.

Address translation in a virtual memory system typically incorporates accessing various address translation data structures. One such structure, referred to as a page table, includes multiple entries that map virtual addresses to real addresses on a page-by-page basis. Likewise, for handling segmentation, a segment table is often provided, including entries that map effective addresses to virtual addresses on a segment-by-segment basis.

Often, due to the large number of memory accesses that constantly occur in a computer, the number of entries required to map all of the memory address space in use by a computer can be significant, and require the entries to be stored in main storage, rather than in dedicated memory, which makes accessing such entries prohibitively slow. To accelerate address translation with such a scheme, high speed memories referred to as translation lookaside buffers (TLB's) and segment lookaside buffers (SLB's) are typically used to cache recently-used entries for quick access by the computer. If a required entry is not stored in a TLB or SLB, a performance penalty is incurred in loading the entry from main storage; however, typically the hit rate on TLB's and SLB's is exceptionally high, and the penalty associated with loading entries from main storage is more than offset by the performance gains when entries are immediately accessible from the TLB and SLB.

In still other designs, an additional level of caching may be used to further accelerate performance, by providing an effective to real address translation (ERAT) table that includes entries providing direct mappings between effective and real addresses. Thus, an ERAT table effectively includes information from both the SLB and the TLB to eliminate the need to perform two levels of translation. In some designs, separate data and instruction ERAT tables are respectively provided in close proximity to the instruction and data processing logic in a processor to minimize the effects of address translation on the critical performance paths in the processor.

Originally, paging was based on fixed page sizes, e.g., 4K or 4096 addressable locations per page. With the use of segmentation, however, different page sizes may be supported in different segments. Smaller page sizes are often optimal for efficient use of a memory system, particularly when many processes are running concurrently in a computer. However, as the memory requirements of computers and the programs running thereon continue to increase, the number of pages of memory required by any given process or program continues to increase, and as a result, larger page sizes may be more efficient for many situations.

In many designs, large pages, i.e., pages larger than 4K pages, must be allocated at boot time. To avoid this need for pre-allocation, some operating systems implement "transparent" huge pages, which attempts to collect sequential pages and make a translation into a large page. Generally, however, an operating system is unaware of the possibility of allocating large pages, and defaults to making 4K page allocations.

SUMMARY

According to an embodiment of the present invention, a page fault may be handled in a data processing system of a type supporting multiple memory page sizes by detecting a page fault generated by hardware translation logic of a processor and associated with a virtual address requested by program code executed by the processor, determining from the virtual address a page size hint encoded into an unused and reserved field of the virtual address, and performing a software address translation operation for the virtual address using the determined page size hint.

According to another embodiment of the present invention, a program may be built by encoding a page size hint into an unused and reserved field of a virtual address referenced by a memory access instruction, and building the program with the memory access instruction such that, upon detection of a page fault caused by the memory access instruction by hardware translation logic of a data processing system upon which the program executes, the page size hint is used when performing the software address translation operation.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1A:
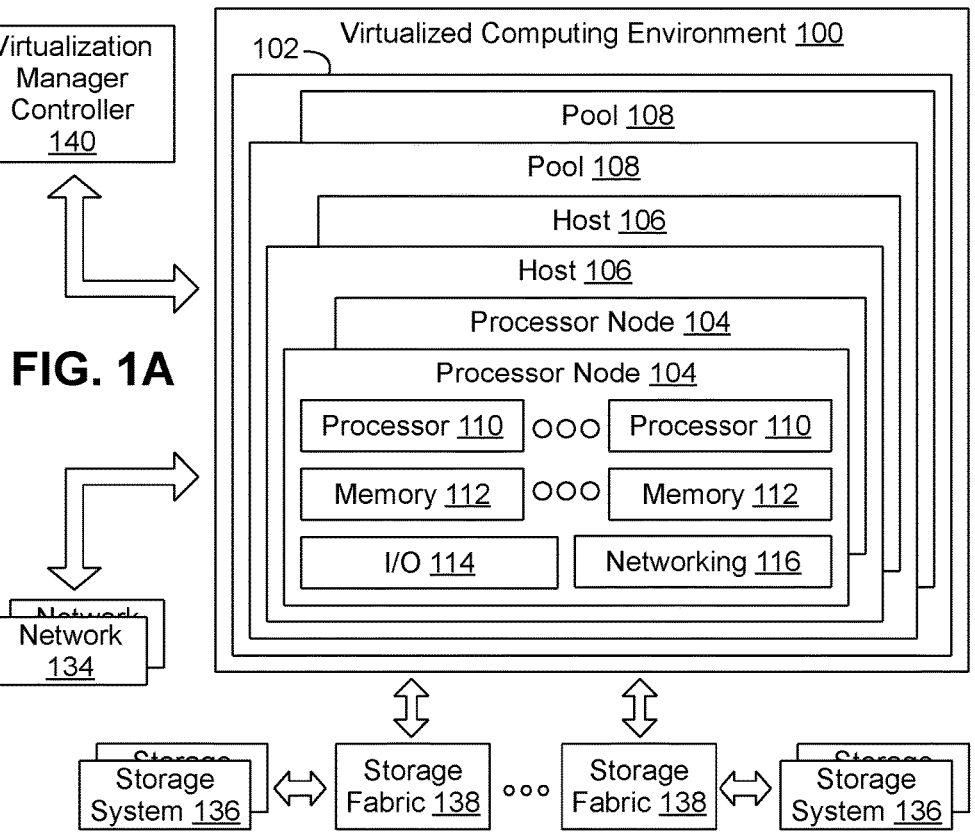
FIGS. 1A and 1B are block diagrams of an example hardware (FIG. 1A) and software (FIG. 1B) environment in accordance with the various techniques described herein.
Figure 1B:
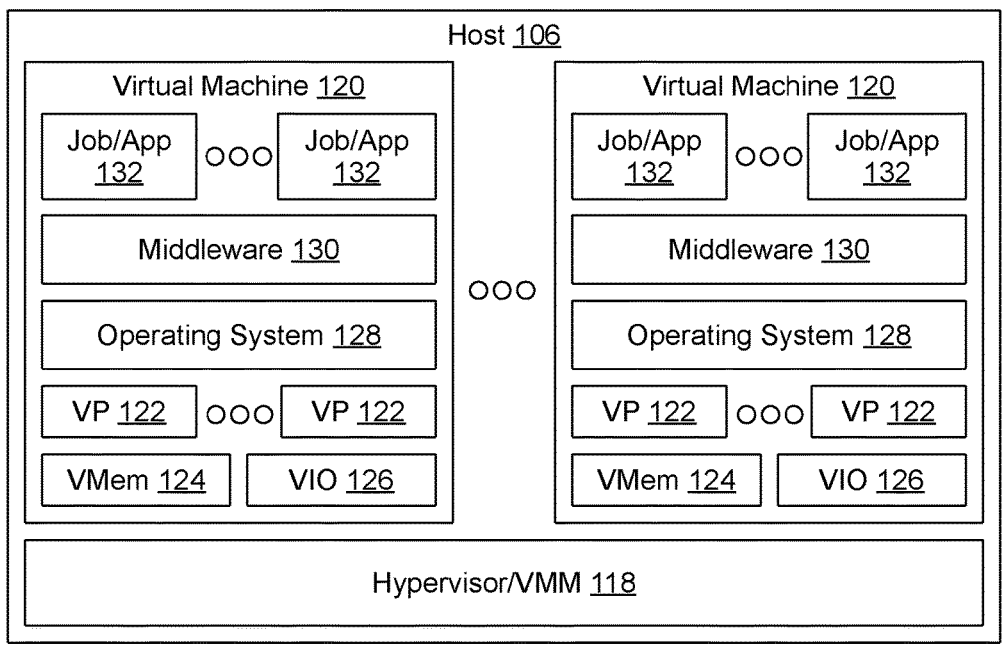

Referring now to the Drawings, wherein like numbers denote like parts throughout the several views, FIGS. 1A-1B illustrate the principal hardware and software components in a data processing environment or apparatus 100 consistent with the invention, and suitable for implementation of memory address translation in various cloud and/or non-cloud computing environments. As shown in FIG. 1A, apparatus 100 may include a multi-node data processing system 102 where the physical hardware is distributed among a plurality of physical processor nodes 104 disposed in a plurality of hosts or computer systems 106, with the hosts 106 disposed in one or more pools 108. Each processor node 104 includes one or more processors 110, one or more memory devices 112, and in some embodiments, additional hardware such as input/output (I/O) hardware 114 (e.g., one or more input/output (I/O) adapters) and/or networking hardware 116. Appropriate networking functionality (not shown) may also be used to provide data communication between the various processor nodes 104 and hosts 106, as well as other external systems.

Apparatus 100 may be implemented using any of a number of different architectures suitable for implementing a virtualized environment, as well is various architectures suitable for non-virtualized environments, including both multi-user and single-user environments, as well as embedded environments. Thus, apparatus 100 may also represent various desktop computers, supercomputers, servers, laptop computers, tablets, mobile devices, and other programmable electronic devices, etc.

Each processor 110 may be implemented as a single or multi-threaded processor and/or as a single or multi-core processor, while each memory 112 may be considered to include one or more levels of memory devices, e.g., a DRAM-based main storage, as well as one or more levels of data, instruction and/or combination caches, with certain caches either serving individual processors or multiple processors as is well known in the art. In addition, the memory of apparatus 100 may be considered to include memory storage physically located elsewhere in apparatus 100, e.g., any cache memory in a processor, as well as any storage capacity used as a virtual memory, e.g., as stored on a mass storage device or on another computer coupled to apparatus 100.

Apparatus 100 operates under the control of one or more kernels, hypervisors, operating systems, etc., and executes or otherwise relies upon various computer software applications, components, programs, objects, modules, data structures, etc., as will be described in greater detail below. Moreover, various applications, components, programs, objects, modules, etc. may also execute on one or more processors in another computer coupled to apparatus 100 via network, e.g., in a distributed or client-server computing environment, whereby the processing required to implement the functions of a computer program may be allocated to multiple computers over a network.

For example, FIG. 1B illustrates various software components 118-132 that may be resident within a host 106 in apparatus 100. A hypervisor or virtual machine monitor (VMM) 118 may host one or more virtual machines (VMs) 120 and may allocate to each virtual machine 120 a portion of the physical hardware resources of host 106 (e.g., processor, memory and/or IO resources associated with one or more processor nodes 104), represented here by one or more virtual processors (VPs) 122, a virtual memory (VMem) 124 and virtual input/output (VIO) resources 126. Each virtual machine 120 may in turn host an operating system 128 and optionally middleware 130, as well as one or more jobs and/or applications 132. It will be appreciated that each virtual machine 120, which may also be referred to as a logical partition, virtual server or virtual computer, may operate in a manner that emulates a separate physical computer, and as such, may host practically any software components capable of being hosted by a computer.

Additional hardware and/or software components may also be resident in apparatus 100, e.g., mass storage hardware, external input/output devices such as printers or displays, and management hardware and/or software, e.g., a hardware management console (HMC) through which the hardware and/or software configuration of the apparatus may be managed by an administrator. Further, in the illustrated embodiments, connectivity to one or more external networks 134 may also be supported, as may connectivity to one or more storage systems 136 through one or more storage fabrics 138. Virtualized environments may be implemented in an innumerable number of manners, and may include an innumerable number of hardware and/or software variations, and as such, the invention is not limited to the particular implementation disclosed herein.

It will be appreciated that the present invention may be a system, a method, and/or a computer program product. The computer program product may include a computer readable storage medium (or media) having computer readable program instructions thereon for causing one or more processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIGS. 1A and 1B is not intended to limit the present invention. Indeed, those skilled in the art will recognize that other alternative hardware and/or software environments may be used without departing from the scope of the invention.

Embedded Page Size Hint for Page Fault Resolution

Figure 2:
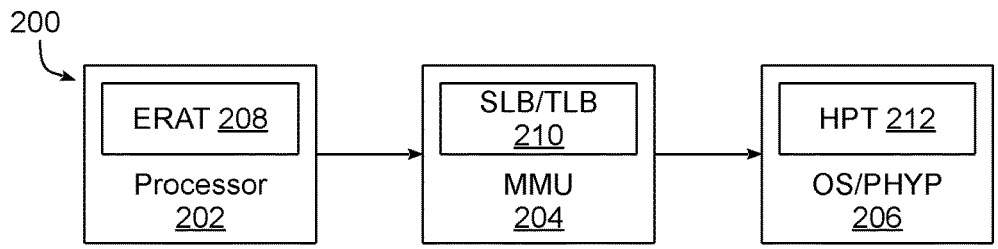
FIG. 2 is a block diagram illustrating example hardware and software entities that may be used to perform address translation in the environment of FIGS. 1A-1B.

Address translation is supported by most modern data processing systems, and generally relies on both hardware and software to resolve to translate between virtual and real memory. FIG. 2, for example, illustrates the address translation functionality in an example data processing system 200. In this data processing system, multiple page sizes are supported, as is segmentation, such that two-level translation is performed, i.e., first from an effective address to a virtual address, and then from a virtual address to a real address. It will be appreciated, however, that the invention is not limited to two-level translation, and may be implemented in different environments where addresses are translated between virtual and real address spaces. For this reason, the discussion hereinafter will refer to the addresses that are referenced by program instructions and translated into addresses in a real address space as "virtual addresses,"

As shown in FIG. 2, for example, a memory access request, such as an attempt to read or write to a virtual memory address or a request to allocate memory, may initially be handled by hardware translation logic in a processor 202, e.g., an Effective to Real Address Translation (ERAT) unit 208, which may be implemented in some embodiments using separate data-specific and instruction-specific units (dERATs and iERATs). If a hit occurs on ERAT 208, the address translation may be handled within processor 202; however, if a miss occurs, the memory access request is typically forwarded to a memory controller or Memory Management Unit (MMU) 204, which may be on the same or a different chip than processor 202. MMU 204 may process the request using hardware translation logic including one or more Translation Lookaside Buffers (TLBs) and/or Segment Lookaside Buffers (SLBs) 210. In response to a hit on the TLB and/or SLB 210, the memory access request may be handled within MMU 210; however, if a miss occurs, a page fault is generally signaled to software 206, e.g., an Operating System (OS), hypervisor, virtual machine monitor, kernel or other low level software in a data processing system, to access various software data structures collectively referred to as Hardware Page Tables (HPTs) 212 and thereby resolve the page fault.

It will be appreciated that each ERAT 208, SLB/TLB 210, and HPT 212 may include at least address translation data that maps between two different addresses, e.g., between a virtual or effective address and a real address. In some embodiments, this address translation data may be implemented as and referred to as a page table entry (PTE). It will be appreciated, however, that PTEs may include additional information, such as protection data that restricts access to particular processes or types of processes or to particular access types (e.g., read only), status data such as a valid/invalid indicator or a dirty indicator, tracking data such as a counter or least recently used indicator, page size data, etc. Furthermore, while in some embodiments the PTEs of each ERAT 208, SLB/TLB 210, and HPT 212 may be similarly configured, in other embodiments the PTEs may differ from one another at different levels of the memory hierarchy and may include different, additional or less data than at other levels, so references to a PTE or virtual/effective address that is passed between different levels of a memory hierarchy may encompass modification of data, supplementation of additional data and/or discarding of data associated with a PTE or virtual/effective address in association with formatting the PTE or virtual/effective address in a format suitable for the particular data structure implemented at that level of the hierarchy.

It will be appreciated that a wide variety of address translation implementations may be used in various embodiments of the invention, and thus the invention is not limited to the implementation of FIG. 2. For example, in Non-Uniform Memory Access (NUMA) environments, multi-core environments, and other environments, address translation logic and/or functionality may be distributed differently throughout a data processing system, and various combinations of data structures, buffers, tables, etc. may be used to maintain address translation data or PTEs for use by the address translation functionality of a data processing system consistent with the invention. For example, HPT 212 may be implemented in some embodiments using multiple tables, multi-level tables, nested tables, virtualized tables in an attempt to minimize the latency associated with address translation operations that miss on the hardware translation logic. It will also be appreciated that the latency associated with performing address translation operations may vary in some embodiments due to the need to potentially access multiple data structures, as well as the potential need to retrieve those data structures from slower memory or even mass or persistent storage.

Further, it will be appreciated that in various embodiments of the invention, multiple page sizes may be supported. In general, pages larger than a default size (e.g., 4K or 4096 bytes in some embodiments) may be referred to as large or huge pages. Large pages may be useful, for example, with some types of workloads, e.g., when a program includes a relatively large amount of contiguous data and/or instructions and/or where large blocks of data are accessed frequently and/or repeatedly. In contrast, other workloads, e.g., workloads where memory accesses are more distributed and random, smaller page sizes may offer better performance.

In some conventional approaches, pages larger than a default size are required to be allocated at boot time, while in other conventional approaches, pre-allocation may be avoided through the use of "transparent" huge pages, in which an operating system or similar software attempts to collect sequential pages and perform translations into a large or huge page. However, generally the operating system is unaware of conditions particularly suitable for the use of large or huge pages, so operating systems and other software-based address translation logic generally have a limited ability to intelligently allocated different sizes of pages to account for different types of workloads or scenarios.

Embodiments consistent with the invention, however, may be used to optimize the allocation of memory and the handling of page faults in a data processing system through the provision of page size hints to an operating system, hypervisor/virtual machine manager, or other software-implemented page fault handling logic in a data processing system. The page size hints may be embedded, for example, into virtual addresses that are requested by program code instructions in a program executing in such a data processing system, and in particular within reserved and/or unused fields of the virtual addresses. The page size hints may then be read by software-implemented page fault handling logic to control the page size allocated in response to a memory access request and/or to optimize the search for address translation data from one or more hardware page tables in response to a memory access request.

In some embodiments consistent with the invention, for example, a page fault generated by hardware translation logic of a processor may be detected by a software page fault handler, a page size hint encoded into an unused and reserved field of the virtual address may be determined, and then a software address translation operation may be performed for the virtual address using the determined page size hint. As will become more apparent below, in some embodiments, doing so enables a hint as to page size to be seamlessly communicated by an executing program to a software page fault handler to accelerate memory allocations and/or address translations by in part reducing the latency associated with accessing data structures such as hardware page tables and the like.

In this regard, hardware translation logic may be considered to include various types of hardware-implemented address translation functionality, e.g., as may be implemented within a processor, processor core, memory controller, memory management unit, cache controller, etc., and including various data structures such as ERATs, SLBs, TLBs, or the like. Likewise, a software page fault handler may be considered to include various types of software-implemented address translation functionality, e.g., as may be implemented within an operating system, kernel, hypervisor, virtual machine monitor, or other low level software for accessing various types of translation data structures including various types of page tables.

A software page fault handler may be configured in some embodiments to implement various types of software address translation operations. One type of software address translation operation that may be performed is a search for a page table entry or other address translation data for use in completing an address translation from a virtual address to a real address. Another type of software address translation operation that may be performed is the allocation of a new memory page, e.g., in response to determining that a requested virtual address has not yet been mapped to a real address and no memory page has yet been allocated for that virtual address. Additional software address translation operations may include various management operations such as modifying or deallocating memory pages, swapping memory pages in and out of main memory, etc.

Figure 3:
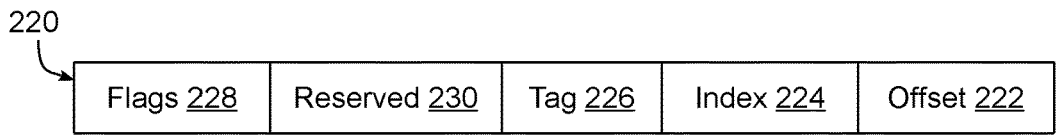
FIG. 3 is a block diagram of an example effective address format usable in the environment of FIGS. 1A-1B.

Now turning to FIG. 3, an example effective or virtual address format suitable for use in connection with communicating page size hints is illustrated at 220. Format 220, in particular, represents any of a number of typical address formats that may be used in connection with some embodiments of the invention, including an offset field 222 representing an offset into a memory page corresponding to the effective or virtual address and index and tag fields 224 and 226 together representing a unique identifier for a virtual page. Index field 224, for example, may be used to address a data structure containing PTEs, with tag field 226 used to distinguish the indexed page from other pages mapped to the same index. In some embodiments, tag field 226 may be omitted, with index field 224 being sufficient to address the page in a data structure.

Format 220 may also optionally include one or more flags 228, which may provide information such as status information, access control information, or other information as will be appreciated by those of ordinary skill in the art having the benefit of the instant disclosure.

Format 220 may also include a reserved field 230 including one or more bits that are unused and reserved. Unused and reserved, within the context of the invention, refers to a field in a virtual or effective address that is explicitly reserved by the system for future use, and that is unused for address translation purposes or otherwise for addressing a location in memory. It is within reserved field 230, therefore, that a page size hint may be encoded in embodiments consistent with the invention.

As one example implementation, in the case of 64-bit Radix translation, e.g., as implemented in the Power8 architecture, 10 bits (e.g., bits 2-11 Big Endian or bits 61-52 Little Endian), are reserved by the architecture and are unused for the purposes of address translation or otherwise referencing memory. In one example embodiment, one or more bits of this field may be used to provide page size hints as illustrated in Table I below:

TABLE I

Page Size Hint Encoding

| | | |
|---|---|---|
| Nest translation page size mask bits: | 0x3100000000000000 | # Mask bits to know the page size of an address |
| Nest translation off mask bit: | 0x0000000000000000 | # 4K page mapping |
| Nest translation 4K mask bit: | 0x0800000000000000 | # 64K page mapping |
| Nest translation 64K mask bit: | 0x1000000000000000 | # 2 MB page mapping. In case of Hash this will mean that we are MPSS 4K/64K |
| Nest translation 16MB mask bit: | 0x1100000000000000 | # 16 MB page mapping |
| Nest translation off mask bit: | 0x2000000000000000 | # 16 GB page mapping |
| Nest translation off mask bit: | 0x2100000000000000 | # Reserved for future encodings |
| Nest translation off mask bit: | 0x300000000000000 | # Reserved for future encodings |
| Nest translation off mask bit: | 0x310000000000000 | # Reserved for future encodings |

With the above encoding, an effective address may become a convention for compilers, linkers and applications to request an operating system or other software-based address translation functionality for translation. In addition, in some embodiments, this encoding may be incorporated into a header file, and may be changed for new compiles of an operating system, compiler, linker and/or application.

It will be appreciated that in some embodiments, non-zero values in reserved field 230 may result in the assertion of an illegal address condition by a memory management unit or other hardware translation logic. Conventionally, such a condition generally results in an operating system terminating an application or device driver. In some embodiments, however, this condition may be captured and used to provide a page size hint for address translation purposes. Also, in some embodiments, the hardware translation logic may include a configurable mode that may be enabled or disabled in order to prevent the condition from being signaled (i.e., such that the hardware translation logic simply ignores the non-zero bits). As such, whenever page size hints are used, the mode of the hardware translation logic may be set appropriately.

Figure 4:
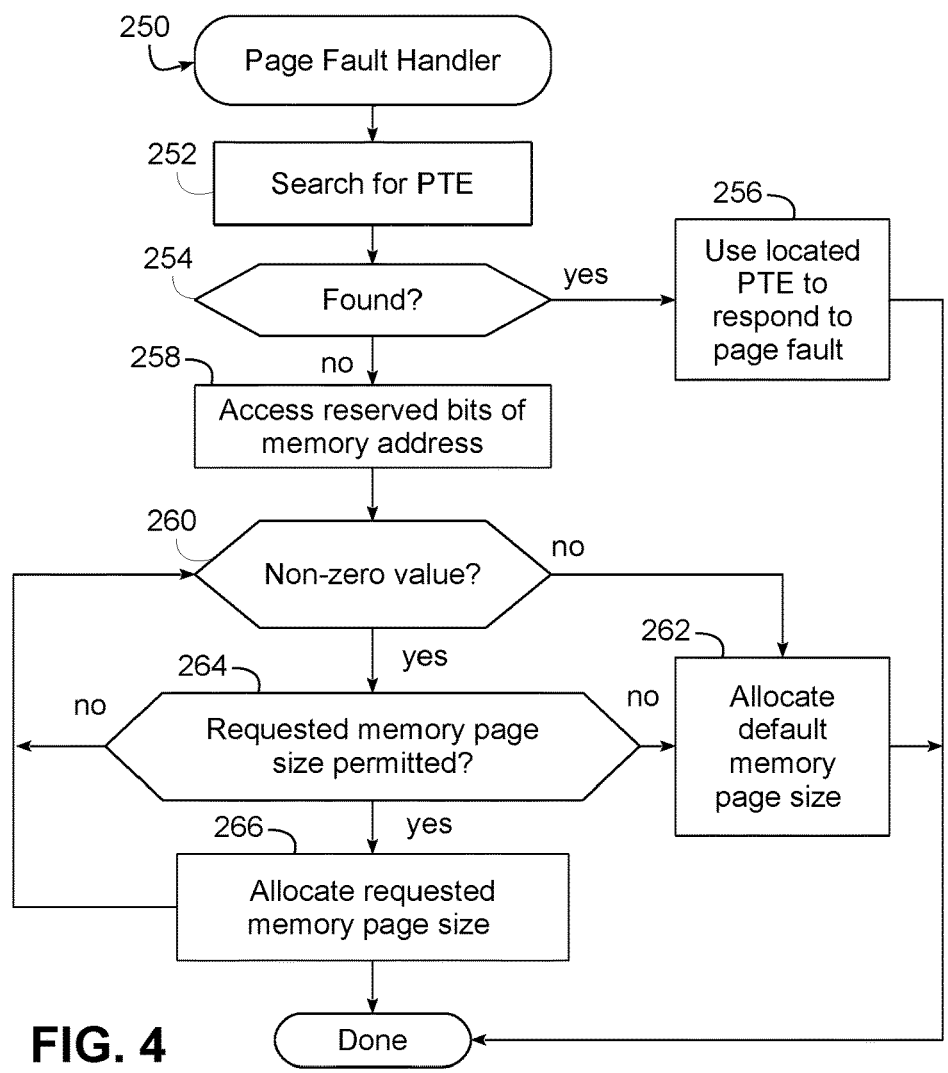
FIG. 4 is a flowchart illustrating an example sequence of operations for handling a page fault in the environment of FIGS. 1A-1B.

Now turning to FIG. 4, this figure illustrates a sequence of operations 250 for a software page fault handler implementing software-implemented page fault handling logic incorporating support for page size hints in a manner consistent with the invention. This sequence of operations may be initiated, for example, in response to assertion of a page fault by hardware translation logic, and may be implemented in an OS, hypervisor, virtual machine monitor, kernel or other low level software. Further, sequence 250 implements automatic allocation of new memory pages in response to page faults associated with effective addresses that have not yet been allocated, although it will be appreciated that in other embodiments, memory allocation may be handled separately from page fault handling.

Sequence 250 is presented with a virtual address, e.g., an effective address, and begins in block 252 by searching for a matching page table entry in one or more data structures implementing the hardware page table for the environment. Deferring for the moment the operations involved with searching for a matching page table entry (which are discussed below in connection with FIG. 5), control passes next to block 254, where a determination is made as to whether a matching page table entry has been found. If so, control passes to block 256 to use the located page table entry to respond to the page fault, in a manner that will be apparent to those of ordinary skill in the art having the benefit of the instant disclosure. If not found, however, block 254 passes control to block 258 to access one or more of the reserved bits of the effective address to determine if a page size hint has been encoded into the effective address, e.g., by applying a mask and determining if any of the unmasked bits are non-zero values. If the unmasked bits are all zero, block 260 passes control to block 262 to allocate a new memory page having a default memory page size to the effective address, as no page size hint is encoded in the effective address. Allocation of a new memory page may include both reserving a memory page for the process by creating a new page table entry for the memory page, and swapping that page into main memory, or other operations or combinations of operations that will be apparent to those of ordinary skill in the art having the benefit of the instant disclosure. Particularly in the case of hardware page tables incorporating multiple page size-specific data structures corresponding to different page sizes, creation of a new page table entry may encompass creating the new page table entry in a data structure specific to the default page size.

On the other hand, if block 260 determines that a non-zero value is stored in the unmasked bits of the effective address, a page size hint is encoded in the effective address, and control passes to block 264 to determine whether the requested memory page size of the page size hint is permitted. For example, the requested memory page size may be denied if the amount of memory requested is not available. If not permitted, control passes to block 262 to allocate the default page size; however, if permitted, control instead passes to block 266 to allocate a new memory page with the requested page size indicated by the page size hint. In the case where different data structures maintain page table entries associated with different page sizes, for example, a new page table entry may be created for the new memory page in the data structure specific to the page size indicated by the page size hint. Upon completion of any of blocks 256, 262 or 266, the page fault is considered handled, and sequence 250 is complete.

Figure 5:
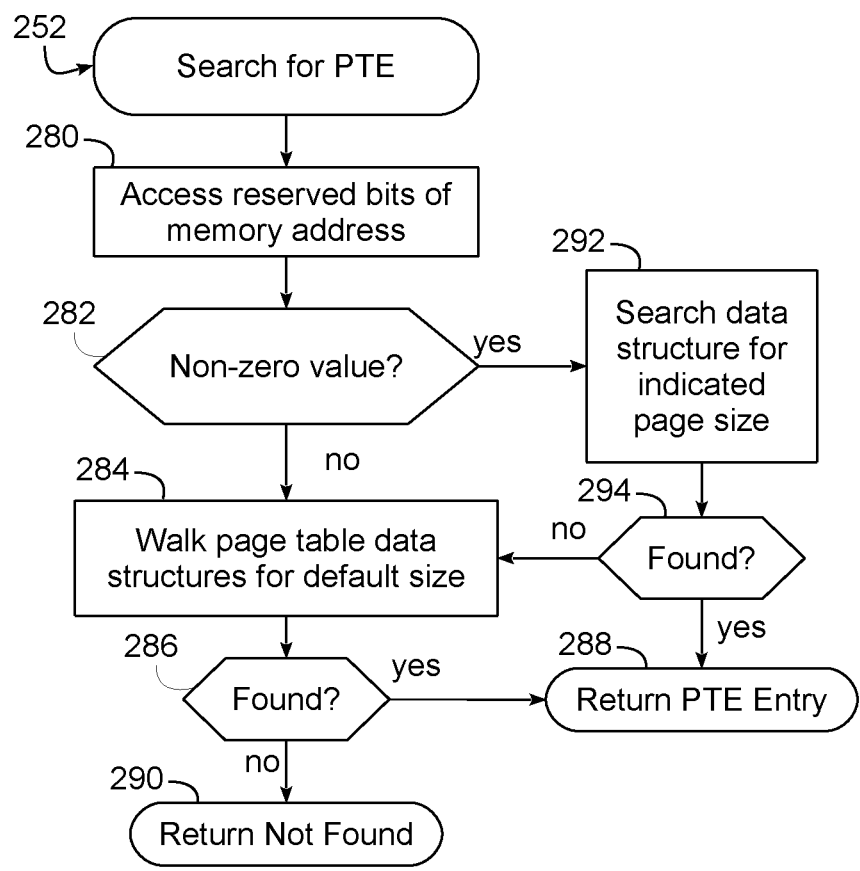
FIG. 5 is a flowchart illustrating an example sequence of operations for implementing the search for PTE block referenced in FIG. 4.

As such, with sequence 250, a page size hint encoded into an effective address may be used to create a new page table entry and allocate a new memory page based upon the page size indicated by the page size hint. However, in some embodiments, a page size hint may be usable to accelerate and/or simplify handling of a page fault for a memory page that has already been allocated. FIG. 5, for example, illustrates an example sequence of operations for implementing search for PTE block 252 of FIG. 4. It will be appreciated that a similar sequence of operations may also be used in implementations where memory allocation is handled separately from page fault handling.

First, in block 280, one or more of the reserved bits of the effective address input to the page fault handler are accessed to determine if a page size hint has been encoded into the effective address, e.g., by applying a mask and determining if any of the unmasked bits are non-zero values. If the unmasked bits are all zero, block 282 passes control to block 284 to walk the various hardware page table data structures to attempt to find a matching page table entry for the effective address assuming a default page size. In some embodiments, the lack of a page size hint may also result in locating a matching page table entry corresponding to memory pages with page sizes other than the default page size. It will also be appreciated that the search performed in block 284 may also be computationally expensive as several different data structures may need to be accessed to attempt to locate a matching page table entry, and may even need to be retrieved from mass storage, as will be appreciated by those of ordinary skill in the art having the benefit of the instant disclosure. Block 286 thus determines whether a matching page table entry was found, and if so, the matching page table entry is returned in block 288. If not, however, control passes to block 290 to return a not found indication.

On the other hand, if block 282 determines that a non-zero value is stored in the unmasked bits of the effective address, a page size hint is encoded in the effective address, and control passes to block 292 to search one or more data structures that are associated with the page size indicated by the page size hint. Given that the expected page size is known, the search performed in block 292 may therefore be less computationally expensive than a full search, and thus the page size hint-assisted search may be more efficient than a full search and may, in some embodiments, reduce latency associated with a page table fault.

Block 294 next determines whether a matching page table was found, and if so, control passes to block 288 to return the matching page table entry. Otherwise, block 294 may pass control to block 284 to attempt a full search. In other embodiments, however, no full search may be required, and block 294 may instead return a not found indication by passing control directly to block 290. As such, with block 252, a page size hint encoded into an effective address may be used to accelerate location of a page table entry based upon the page size indicated by the page size hint. In some embodiments, for example, the acceleration may occur as a result of bypassing an access of at least one data structure that would normally be accessed when walking the hardware page table for a memory access instruction lacking an encoded page size hint.

It will be appreciated that page size hints may be encoded into an effective or virtual address in a number of manners consistent with the invention. In some embodiments, for example, page size hints may be encoded into virtual addresses in connection with building a program, e.g., during the compilation, optimization, linking, installation or deployment of a program. In such embodiments, during building of a program, page size hints may be encoded into the unused and reserved fields of one or more virtual addresses referenced by memory access instructions in a program, and the program may be built with the memory access instructions such that, upon detection of page faults caused by the memory access instructions by hardware translation logic of a data processing system upon which the program executes, the page size hints may be used when performing software address translation operations.

Figure 6:
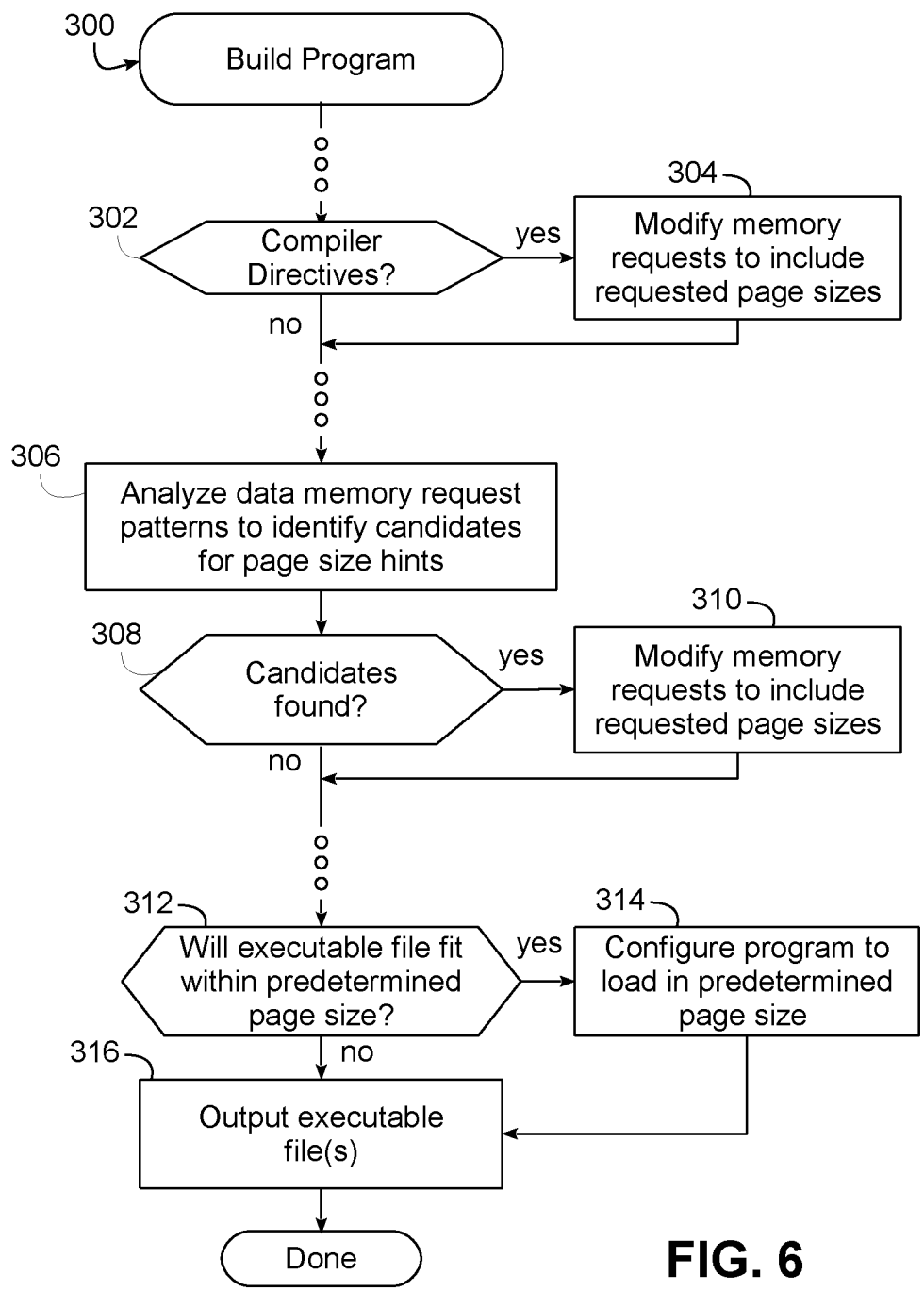
FIG. 6 is a flowchart illustrating an example sequence of operations for building a program in the environment of FIGS. 1A-1B.

FIG. 6, for example, illustrates a build program sequence of operations 300 including three different scenarios that may be supported in some embodiments of the invention. In the example of FIG. 6, page size hints are illustrated as being encoded into memory access instructions in response to compiler directives (blocks 302-304), in response to optimization (blocks 306-310), and in response to generation of an executable file (blocks 312-314). Other operations performed during the building of a program, e.g., parsing source code, generating intermediate codes, running various code optimizations, packaging code generating executable code, linking code with other executable code and/or libraries, deploying or installing code, etc., are omitted from FIG. 6 for the purposes of simplifying the discussion hereinafter, but it will be appreciated that such operations are generally understood in the art, and incorporation of the herein-described functionality into any of these operations would be well within the abilities of those of ordinary skill in the art having the benefit of the instant disclosure. FIG. 6 does, however, illustrate in block 316 the output of one or more executable files as a result of the build, which it will be appreciated may include one or more memory access instructions having a page size hint encoded into an unused and reserved field of the effective or virtual address thereof. It will also be appreciated that in some embodiments, all three scenarios illustrated in FIG. 6 may not be supported. It will also be appreciated that in other embodiments, different scenarios may be used to encode page size hints into the memory access instructions of a program, so the invention is not limited to the particular scenarios illustrated in FIG. 6.

Blocks 302-304, for example, illustrate a scenario where an application developer inserts a compiler directive into the source code of an application under development, which may be detected by a compiler (block 302) to cause the compiler to modify one or more memory access instructions in a program to encode page size hints into those memory access instructions (block 304). A compiler directive may, for example, enable or disable page size hint encoding for all or for sections of the source code. A compiler directive may also specify a desired page size for specific memory allocation instructions, for a particular section of code, or for certain types of instructions (e.g., for instructions that fetch data vs. instructions that fetch other program instructions, etc.). Directives may be associated with individual instructions, with sections of code, specific methods, classes or modules, or with an entire program. In general, the directives enable an application developer to control the program build process to cause the application under development to use the page sizes desired by the application developer. It will also be appreciated, however, that in other embodiments, a developer may also control the use of page size hints in other manners.

Blocks 306-310, on the other hand, illustrate a scenario where a compiler identifies, e.g., during optimization, that certain page sizes would be optimal for certain memory access instructions or requests. For example, block 306 may analyze, as part of optimization, memory request patterns in an attempt to identify suitable candidates for encoding page size hints. In response to identifying such candidates, block 308 may divert control to block 310 to modify the memory access instructions associated with such candidates to encode page size hints for suitable page sizes. Suitable candidates might exist, for example, when it is determined that the amount of memory consistently accessed by a critical section of code in the program is larger than the default page size, such that it becomes advantageous to maintain the entire amount of memory in a single, larger page rather than within multiple pages that might otherwise be swapped in and out in response to other memory traffic.

Blocks 312-314 illustrate yet another scenario where a compiler or linker may determine whether any executable file generated during the build process will fit within a particular page size. In response to detection of such a scenario, for example, block 312 may pass control to block 314 to configure the program to load in the predetermined page size, e.g., by encoding page size hints into the instructions that allocate memory for a program (or for particular modules, libraries, sections, classes, files, etc. thereof). Thus, for example, if it can be determined that the compiled application will fit within a single 2 MB page, it may be desirable in some embodiments to configure the application to request a 2 MB page when loaded such that the entire application is loaded into a single page of memory. By doing so, page swapping in order to load various modules or sections of code for the application is avoided, thereby improving overall application performance in appropriate scenarios.

Thus, embodiments consistent with the invention may enable unused and reserved bits of virtual or effective addresses to be repurposed to communicate page size hints to software page fault handling functionality in an operating system, hypervisor, virtual machine monitor, kernel or other low level software in a data processing system for use in connection with handling a page fault. Moreover, in some embodiments, the actual encoding may be performed prior to execution of the program, and in some embodiments, during compilation, linking, deployment or installation of the program.

Furthermore, in some embodiments, the build process may also include the incorporation of one or more instructions in the program to configure the program hardware translation logic of a data processing system to operate in a mode that disables the generation of illegal address notifications in response to non-zero values in the unused and reserved fields of virtual or effective addresses. In other embodiments, the hardware translation logic may not generate illegal address notifications, and in some embodiments, selection of an appropriate mode may be performed separate of execution of a page size-hint enabled program, e.g., by an operating system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of handling a page fault in a data processing system of a type supporting multiple memory page sizes, the method comprising:
    detecting a page fault generated by hardware translation logic of a processor, the page fault associated with a virtual address requested by program code executed by the processor;
    determining from the virtual address a page size hint encoded into an unused and reserved field of the virtual address, wherein the unused and reserved field is a predetermined field that is separate from any index field, tag field and offset field in the virtual address; and
    performing a software address translation operation for the virtual address using the determined page size hint.

2. The method of claim 1, wherein the page size hint is encoded into the unused and reserved field prior to execution of the program code.

3. The method of claim 2, wherein the page size hint is encoded into the unused and reserved field during compilation, linking, deployment or installation of the program code.

4. The method of claim 1, wherein the hardware translation logic is configurable to operate in first and second modes, wherein in the first mode the hardware translation logic generates an illegal address notification in response to one or more values in the unused and reserved field of the virtual address, wherein in the second mode the generation of illegal address notifications by the hardware translation logic in response to the one or more values in the unused and reserved field of the virtual address is disabled, and wherein the method further comprises configuring the hardware translation logic in the second mode.

5. The method of claim 4, wherein the hardware translation logic is configured to, in the first mode, generate an illegal address notification in response to a non-zero value in the unused and reserved field of the virtual address.

6. The method of claim 1, further comprising selectively allocating a page size corresponding to the determined page size hint based upon available memory.

7. The method of claim 1, wherein determining the page size hint is performed prior to searching one or more data structures of a hardware page table, and wherein performing the software address translation operation for the virtual address using the determined page size hint includes using the determined page size hint to access the one or more data structures.

8. The method of claim 7, wherein the one or more data structures includes at least one page size-specific data structure configured to store address translation information for pages of a specific page size, and wherein performing the software address translation operation for the virtual address using the determined page size hint includes using the determined page size hint to access the page size-specific data structure configured to store address translation information for the page size associated with the page size hint.

9. The method of claim 8, wherein performing the software address translation operation for the virtual address using the determined page size hint includes bypassing an access of at least one other data structure accessed when walking the hardware page table for a memory access instruction lacking an encoded page size hint.

10. The method of claim 9, further comprising, in response to a second page fault associated with a second virtual address requested by program code executed by the processor and lacking an encoded page size hint, walking a plurality of data structures of the hardware page table to identify a page table entry corresponding to the second virtual address.

11. The method of claim 1, wherein determining the page size hint is performed prior to allocating a page of memory for the virtual address, the method further comprising allocating the page of memory for the virtual address with a page size indicated by the page size hint.

12. The method of claim 11, wherein allocating the page of memory for the virtual address with a page size indicated by the page size hint is permitted in response to determining that the page size indicated by the page size hint is permitted.

13. The method of claim 11, further comprising, in response to a second page fault associated with a second virtual address requested by program code executed by the processor and lacking an encoded page size hint, allocating a page of memory for the virtual address with a default page size.

14. The method of claim 1, further comprising determining from the virtual address that a page size hint is encoded into the unused and reserved field of the virtual address by detecting a non-zero value in at least a subset of a plurality of bits in the unused and reserved field.

15. A method of building a program, the method comprising:
    encoding a page size hint into an unused and reserved field of a virtual address referenced by a memory access instruction, wherein the unused and reserved field is a predetermined field that is separate from any index field, tag field and offset field in the virtual address; and
    building the program with the memory access instruction such that, upon detection of a page fault caused by the memory access instruction by hardware translation logic of a data processing system upon which the program executes, the page size hint is used when performing a software address translation operation.

16. The method of claim 15, wherein encoding the page size hint into the unused and reserved field of the virtual address referenced by the memory access instruction is performed during compilation or linking of the program.

17. The method of claim 15, wherein encoding the page size hint into the unused and reserved field of the virtual address referenced by the memory access instruction is performed in response to determining that an executable file for the program will fit within a page size associated with the page size hint.

18. The method of claim 15, wherein encoding the page size hint into the unused and reserved field of the virtual address referenced by the memory access instruction is performed in response to analyzing a data memory request pattern during optimization of the program.

19. An apparatus supporting multiple memory page sizes, the apparatus comprising:
    at least one processor including hardware translation logic; and
    program code configured upon execution by the at least one processor to handle a page fault by:
        detecting a page fault generated by the hardware translation logic, the page fault associated with a virtual address requested by a program executed by the processor;
        determining from the virtual address a page size hint encoded into an unused and reserved field of the virtual address, wherein the unused and reserved field is a predetermined field that is separate from any index field, tag field and offset field in the virtual address; and performing a software address translation operation for the virtual address using the determined page size hint.

* * * * *